May 26, 1970     C. L. SHANO     3,514,686
SPEED RESPONSIVE MOTOR CONTROL CIRCUIT
Original Filed Dec. 27, 1966
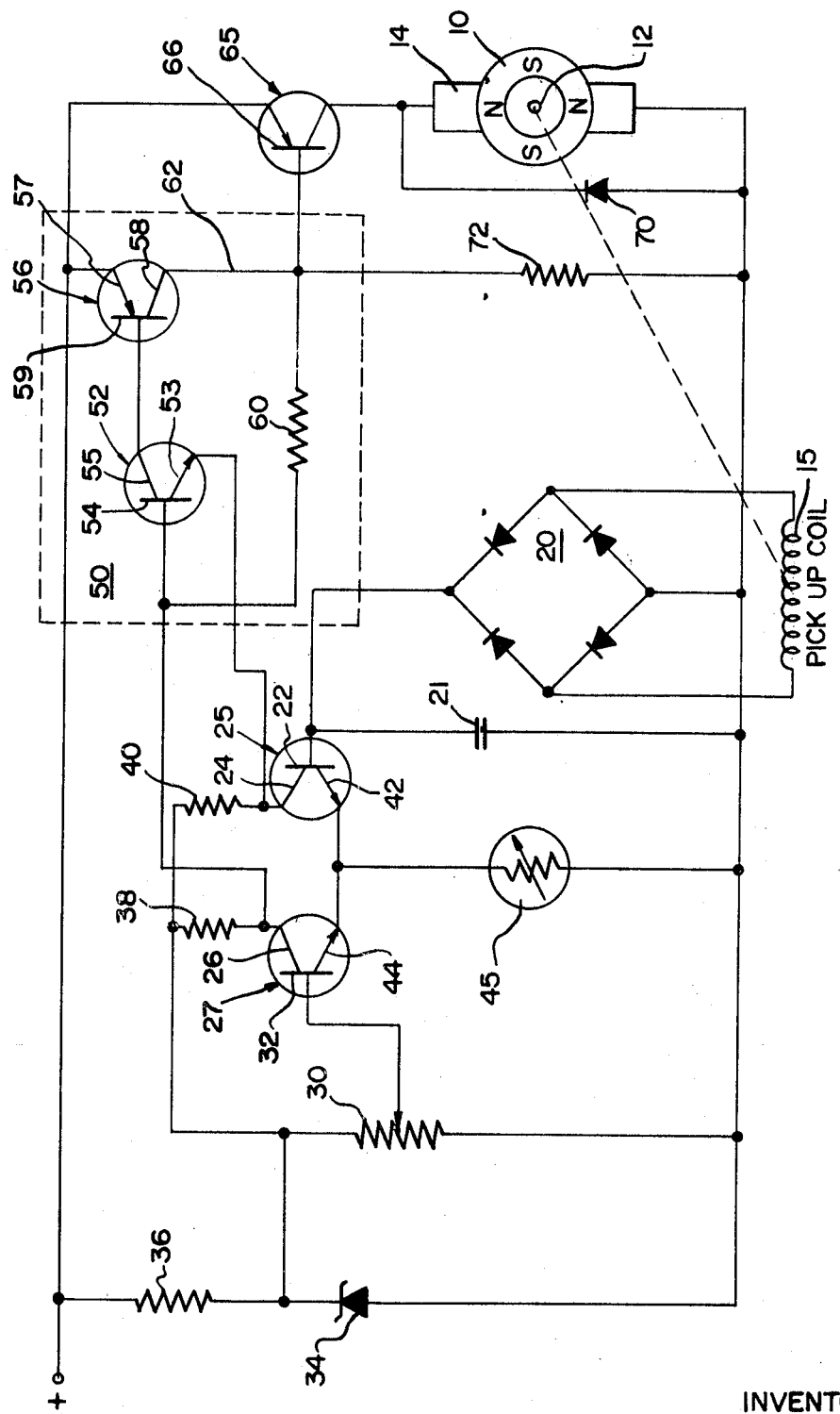
INVENTOR
CHARLES L. SHANO
BY *Mueller, Aichele & Rauner*
ATTORNEYS United States Patent Office 3,514,686
Patented May 26, 1970

3,514,686
SPEED RESPONSIVE MOTOR CONTROL CIRCUIT
Charles L. Shand, Morton Grove, Ill., assignor to Motorola, Inc., Franklin Park, Ill., a corporation of Illinois
Continuation of application Ser. No. 605,034, Dec. 27, 1966. This application May 9, 1969, Ser. No. 824,755
Int. Cl. H02p 5/16
U.S. Cl. 318—327                    3 Claims

ABSTRACT OF THE DISCLOSURE

This circuit uses a differential amplifier for comparing a variable control bias and a generated potential which is proportional to the motor r.p.m. The output of the differential amplifier is used to operate a transistor switch which selectively applies a potential to the motor for controlling its r.p.m.

This case is a continuation of application No. 605,034, filed Dec. 27, 1966 now abandoned.

BACKGROUND OF THE INVENTION

This invention pertains to a control circuit for maintaining a preselected r.p.m. for an electric motor which is subjected to varying load conditions.

Although various motor control circuits have been developed which maintain a constant motor speed under varying load conditions, generally, these circuits have utilized centrifugal contacts to provide the control. These contacts frequently require periodic adjustments in order to maintain a constant and accurate motor r.p.m. under the varying loads. Furthermore, these contacts are subject to wear and mechanical failure.

It is an object of this invention to provide motor control means that eliminates the use of centrifugal contacts to provide the control function.

It is a further object of this invention to provide motor control means that substantially eliminates mechanical wear in the control elements.

SUMMARY OF THE INVENTION

In one embodiment of this invention, a control amplifier selectively applies a potential to an electric motor to drive the same at a constant speed under varying load conditions. The circuit for controlling the control amplifier includes a potentiometer which couples a control bias to one transistor of the differential amplifier to establish the desired motor r.p.m. A disc magnet coupled to and rotating with the motor shaft generates an alternating current in a pickup coil that is proportional to the motor speed. This current is coupled to a second transistor of the differential amplifier. The differential amplifier compares the control bias level with the potential representing the motor r.p.m. and operates a switching circuit to control the control amplifier to drive the motor at a constant r.p.m. under varying load conditions.

The single figure of the drawing shows a schematic wiring diagram illustrating the motor control circuit in accordance with this invention.

DESCRIPTION OF THE PREFERRED EMBODIMENT

Referring to the figure of the drawing, a disc magnet 10 is shown mounted to a shaft 12 of an electric motor 14. A pickup coil 15, which is schematically shown in the drawing, is located in the vicinity of the motor such that the magnet 10 rotates in a close proximity thereto to generate an alternating current in the coil. Because this magnet 10 rotates with the speed of the motor, the alternating current generated in the coil is proportional to the motor r.p.m. The direct current output from the bridge rectifier 20 is filtered by capacitor 21 and coupled to the base 22 of NPN transistor 25.

The NPN transistor 25 cooperates with NPN transistor 27 to form a differential amplifier. The second input to the differential amplifier is a potential coupled by variable resistor or potentiometer 30 to the base 32 of the transistor 37. The Zener diode 34 provides a constant voltage to the potentiometer 30 independent of variations in the supply potential. The resistor 36 provides current limiting protection for the Zener 34. The regulated constant voltage from Zener 34 is also coupled to biasing resistors 38 and 40 for transistors 27 and 25, respectively. The emitters 42 and 44 of the transistors 25 and 27 respectively are connected to each other and through a thermistor 45 which provides temperature compensation for the differential amplifier.

A transistor switch 50 includes an NPN transistor 52 which has its base 54 connected to the collector 26 of transistor 27, and the emitter 53 connected to the collector 24 of transistor 25. The switch 50 also includes a second PNP transistor stage 56. The emitter 57 of transistor 56 is coupled to B+, and the collector 58 is coupled by resistor 60 to the base 54 of transistor 52 to form a positive feedback loop. The collector 55 of transistor 52 is coupled to the base 59 of transistor 56. Therefore, when transistor 52 is conducting transistor 56 is also turned on. The positive feedback path through resistor 60 enhances the switching action.

Coupled to the output 62 of the transistor switch 50 is a PNP transistor 65 which acts as a control amplifier. When the transistor switch 50 is switched on the potential rises on the base 66 of transistor 65 and it is switched off. Likewise, when the transistor switch 50 is switched off, the potential decreases on the base of transistor 65 biasing the transistor into conduction. When the transistor 65 conducts it applies B+ to the armature of the motor 14 to drive the motor. Of course, when the amplifier 65 is switched off the current is removed from the motor armature. In this way, the r.p.m. of the motor may be regulated. The diode 70 is coupled across the motor 14 to suppress negative transients in the circuit and to protect transistor 65.

In operation, when a potential is first applied to the circuit, the transistor 65 conducts since it is forward biased by resistor 72. The potential is applied through transistor 65 to the motor, which speeds up until the potential coupled from the pickup coil 15 by bridge rectifier 20 to the base 22 of transistor 25 exceeds the control bias potential coupled to base 32 of transistor 27 by potentiometer 30. At this point, transistor 25 of the differential amplifier will be driven into conduction and transistor 27 will be turned off. With transistor 25 conducting, transistor 52 of the transistor switch 50 is turned on, which turns on transistor 56 to turn off the control amplifier transistor 65. When transistor 65 is turned off, the potential is removed from the armature of the motor 14 and the motor slows down. The process is reversed once the potential generated in the pickup coil falls below the control bias level established by potentiometer 30. At this point transistor 27 of the differential amplifier is biased on and transistor 25 is turned off. With transistor 27 conducting, the transistor switch 50 is turned off. This decreases the potetntial on base 66 of transistor 65 turning that transistor on and applying potential once again to the armature of the motor 14 to drive the motor.

It can be seen from the above description that by changing the setting on the potentiometer 30, one is able to accurately establish the r.p.m. at which the motor 14 will rotate because, if the load on the motor is decreased the motor r.p.m. will increase thereby increasing the generated potential so that it exceeds the bias voltage established by potentiometer 30 on transistor 27. This turns off transistor 27 and transistor 25 of the differential amplifier is turned on to remove the potential from the armature of the motor 14 to slow the motor. In turn, if the load on the motor increases to slow the motor, the generated potential will fall below the control bias potential, and the differential amplifier will operate the transistor switch 50 to turn on the control amplifier 65 to drive the motor faster.

Therefore, the regulated r.p.m. of the motor will be that established by the setting of potentiometer 30.

The disc magnet 10 may be made from a ceramic material and polarized on its circumference alternately north and south as shown in the drawing. Because there are no engaging mechanical parts, there is no wear on the sensing device so that the control means described will have a good longevity.

What has been described, therefore, is a motor control circuit that eliminates the uses of centrifugal contacts to provide the control function thereby reducing mechanical wear and extending the life of the control circuit.

I claim:

1. A motor control circuit including in combination, voltage comparing circuit means, reference circuit means including a Zener diode, said reference circuit means being connected to said voltage comparing circuit means for establishing a control bias thereon representing a predetermined motor r.p.m., sensing circuit means including generator means for generating an alternating potential representing the r.p.m. of the motor and rectifier means connected between said generator means and said voltage comparing means for applying a direct current potential thereto representing the r.p.m. of the motor, one of said reference circuit means and said sensing circuit means including variable resistor means for varying the potential therefrom to said voltage comparing circuit means to establish the desired motor r.p.m., switch means including first and second transistors and a positive feedback loop coupled between the same, and control amplifier means for applying a potential to the motor for energizing the same, said first transistor of said switch means being connected to said voltage comparing circuit means and said second transistor thereof being connected to said control amplifier means, said voltage comparing circuit means being responsive to the direct current potential being coupled thereto by said rectifier means to operate said switch means with said positive feedback loop enhancing the switching action to operate said control amplifier means for selectively applying a potential to the motor for accurately controlling the r.p.m. thereof in accordance with the setting of said variable resistor means.

2. The motor control circuit of claim 1 wherein said voltage comparing circuit means includes a differential amplifier comprising first and second transistors, said variable resistor means connects said reference circuit means to said first transistor of said differential amplifier, and said rectifier means is a diode bridge which connects said sensing circuit means to said second transistor of said differential amplifier, the motor control circuit further including said first transistor of said switch means being coupled to said differential amplifier and said second transistor thereof being coupled to said control amplifier, said differential amplifier being responsive to a direct current potential being coupled to said second transistor by said diode bridge rectifier to operate said switch means with said positive feedback loop enhancing the switching action to control said amplifier for selectively applying a potential to the motor for accurately controlling the r.p.m. thereof in accordance with the setting of said variable resistor means.

3. The motor control circuit of claims 1 and 2 wherein said generating means includes magnet means coupled to and rotatably driven by the motor, and pickup means including a coil is positioned in the vicinity of said rotating magnet with said magnet and said coil cooperating to generate an alternating current representing the r.p.m. of the motor.

References Cited

UNITED STATES PATENTS

| 3,078,410 | 2/1963 | Thomas | 323—22 |
| 3,249,839 | 5/1966 | Fay | 318—345 |
| 3,250,981 | 5/1966 | Marks | 323—22 |
| 3,422,331 | 1/1969 | Kearns | 318—345 |

ORIS L. RADER, Primary Examiner

T. LANGER, Assistant Examiner